United States Patent [19]
Murono et al.

[11] Patent Number: 5,793,769
[45] Date of Patent: Aug. 11, 1998

[54] MULTIPLEXED NETWORK CONNECTING APPARATUS

[75] Inventors: Takahiro Murono; Yoichiro Kutsukake, both of Tokyo, Japan

[73] Assignee: Kabushiki Kaisha Toshiba, Kawasaki, Japan

[21] Appl. No.: 688,211

[22] Filed: Jul. 29, 1996

[30] Foreign Application Priority Data

Aug. 11, 1995 [JP] Japan ................................ 7-205971

[51] Int. Cl.⁶ ................................ H04L 12/54
[52] U.S. Cl. .................... 370/401; 370/400; 370/221; 370/245
[58] Field of Search ................... 370/216–217, 370/218–219, 220–225, 226, 400, 401, 242–246; 455/8, 9

[56] References Cited

U.S. PATENT DOCUMENTS

| | | | |
|---|---|---|---|
| 4,831,617 | 5/1989 | Iwasaki | 370/217 |
| 5,315,592 | 5/1994 | Conant et al. | 370/401 |
| 5,379,292 | 1/1995 | Kurata et al. | 370/216 |
| 5,469,428 | 11/1995 | Tokura | 370/224 |
| 5,566,203 | 10/1996 | Brief et al. | 370/226 |

*Primary Examiner*—Chi H. Pham
*Assistant Examiner*—Steven Nguyen
*Attorney, Agent, or Firm*—Oblon, Spivak, McClelland, Maier & Neustadt, P.C.

[57] ABSTRACT

A multiplexed network connecting apparatus comprising, communication lines for connecting in parallel a pair of LANs, relay stations each interposed between each of the communication lines and each of the LANs, transmission means for transmitting a transmission frame from a first LAN of the LANs to a second LAN, and bypass transmission paths each for connecting the relay stations. One of the first relay stations connected to the first LAN, which is designated as an operation system relay station, receives the transmission frame from the first LAN, transfers the transmission frame to the second LAN through the communication line connected to the operation system relay station, and transfers the transmission frame to another of the first relay stations, which is designated as a standby system relay station, through the bypass transmission path when the communication line connected to the operation system relay station malfunctions.

16 Claims, 9 Drawing Sheets

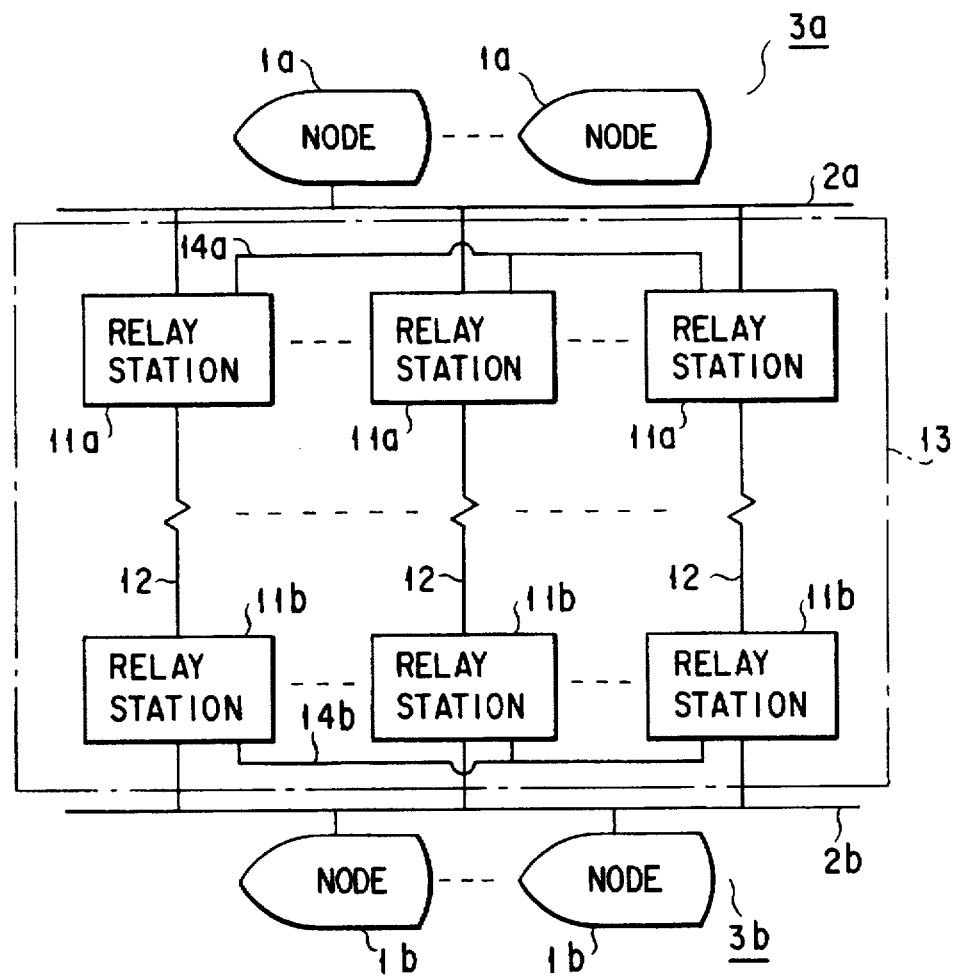
F I G. 1

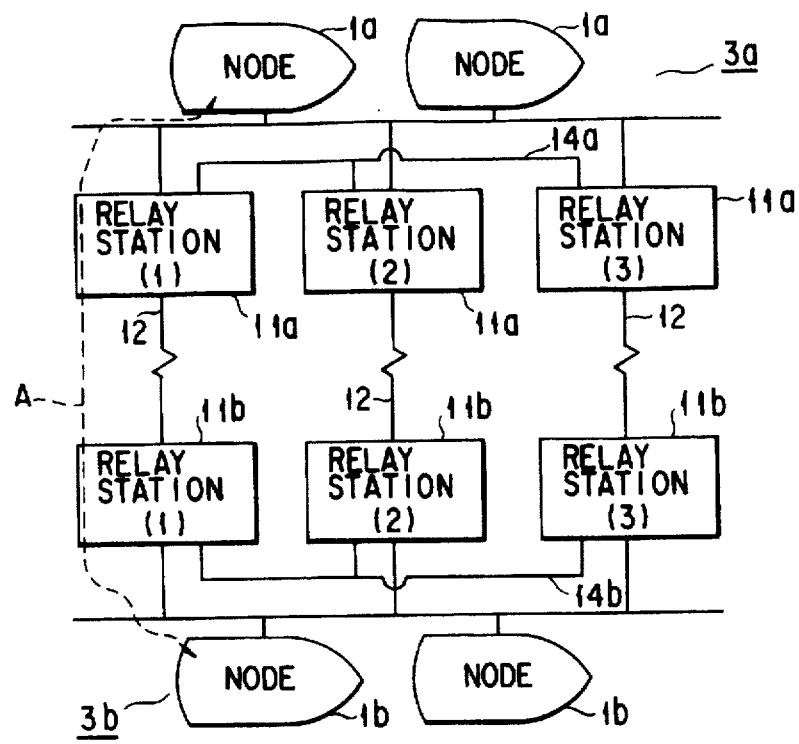
F I G. 13
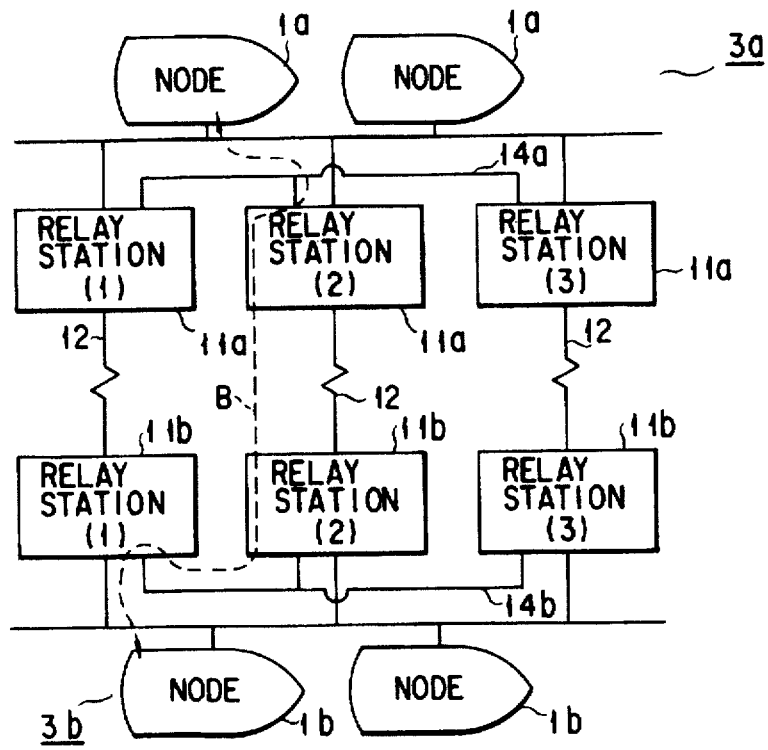
F I G. 14

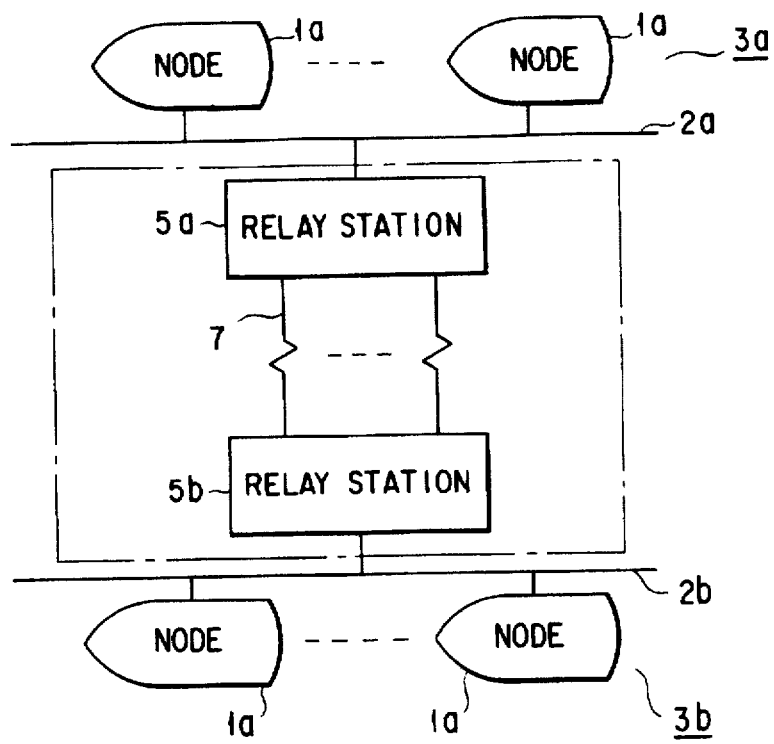
F I G. 17
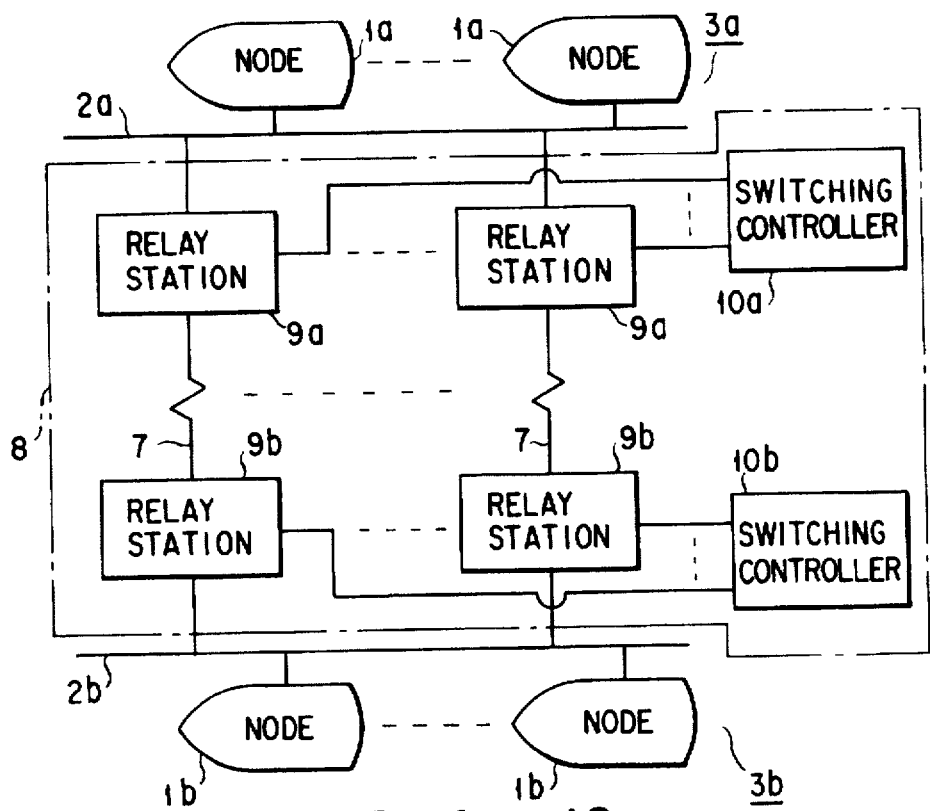
F I G. 18

MULTIPLEXED NETWORK CONNECTING APPARATUS

BACKGROUND OF THE INVENTION

1. Field of the Invention

The present invention relates to a network connecting apparatus for connecting a plurality of LANs (Local Area Networks) which are separated from one another and, more particularly, to a multiplexed network connecting system for connecting a plurality of LANs by a plurality of communication lines.

2. Description of the Related Art

In a multiplexed network connecting apparatus for connecting a plurality of LANs separated from one another, the LANs are connected through relay stations using a plurality of communication lines in order to secure the availability of information communication between the LANs.

FIG. 17 is a block diagram showing the above-described multiplexed network connecting apparatus. This system includes a pair of LANs 3a and 3b, and the LAN 3a has a transmission path 2a and plural nodes 1a connected to the transmission path 2a, while the LAN 3b has a transmission path 2b and plural nodes 1b connected to the transmission path 2b. A multiplexed network connecting apparatus 4 is connected between the LANs 3a and 3b.

In the multiplexed network connecting apparatus 4, relay stations 5a and 5b are connected to the transmission paths 2a and 2b of the LANs 3a and 3b, respectively. The relay stations 5a and 5b are connected to each other by a plurality of communication lines 7.

In the foregoing apparatus 4, usually, one of the communication lines 7, which is designated as an operation system, transfers a transmission frame. If the operation system communication line 7 malfunctions, a standby system communication line 7 is designated as an operation system. The new operation system communication line 7 thus transfers a transmission frame.

In the apparatus 4, however the transmission frame cannot be transferred when one of the relay stations 5a and 5b malfunctions.

Another multiplexed network connecting apparatus 8, as shown in FIG. 18, is proposed in order to resolve the above problem. This apparatus 8 includes a plurality of relay stations 9a and 9b connected to transmission lines 2a and 2b of LANs 3a and 3b, respectively. The opposing relay stations 9a and 9b are connected to each other by a communication line 7. Switching controllers 10a and 10b are connected to the relay stations 9a and 9b, respectively.

The controllers 10a and 10b designate one set of relay station 9a, communication line 7 and relay station 9b as a an operation system and another set thereof as a standby system. When the operation system set malfunctions, the controllers 10a and 10b designate one standby set as an operation system.

If, as described above, the plural relay stations 9a and 9b are connected to the LANs 3a and 3b, respectively, the transmission frame is normally transferred even when the relay stations themselves malfunction.

The multiplexed network connecting apparatus 8 shown in FIG. 18, however, has the following problem to be solved.

In accordance with the type of transmission protocol for transmitting data from a node incorporated into a first LAN to that incorporated into a second LAN, it is necessary to set an address (MAC address) for specifying a relay station, not to directly set an address of a receiving node of the second LAN to a destination address DA of a header of a transmission frame to be sent to a transmission path of the first LAN.

According to the LAN adopting the transmission protocol, if the operation system relay stations 9a and 9b are each changed by its malfunction, the destination address DA of the header of the transmission frame need to be changed to that in the changed relay stations 9a and 9b. Thus, each of the nodes 1a and 1b always necessitates monitoring and controlling which relay station is currently designated as an operation system; accordingly, a burden for transmission at the nodes 1a and 1b is increased.

The multiplexed network connecting apparatus 8 shown in FIG. 18 includes only one set of relay station 9a, communication line 7 and relay station 9b, which is designated as an operation system. Therefore, when a request for transferring a number of transmission frames is made for a short time, even though there are a plurality of relay stations 9a and 9b and a plurality of communication lines 7, the transfer capability of the entire multiplexed network connecting apparatus 8 is restricted by the relay capability of the single relay station 9a (9b). As a result, a number of transmission frames to be relayed are increased and the transmission speed of the transmission frames is decreased in the entire communication network system.

SUMMARY OF THE INVENTION

The present invention has been developed in consideration of the above situation and its first object is to provide a multiplexed network connecting system capable of automatically switching a malfunctioning communication line or relay station to a normal one without causing each node of a LAN to consider whether a relay station is an operation system or a standby system.

A second object of the present invention is to provide a multiplexed network connecting system capable of automatically sharing the processing for relaying a transmission frame with a standby system relay station and a communication line when an operation system relay station increases in the relay processing, and thus improving the transmission efficiency of the transmission frame.

To attain the above first object, there is provided a multiplexed network connecting apparatus comprising:

a plurality of communication lines for connecting in parallel a pair of LANs spaced away from each other;

a plurality of relay stations each interposed between each of the communication lines and each of the LANs;

transmission means for transmitting a transmission frame from a first LAN of the LANs to a second LAN thereof through first relay stations connected to the first LAN, the communication lines connected to the first relay stations, and second relay stations connected to the second LAN; and a plurality of bypass transmission paths each for connecting the relay stations connected to one of the first and second LANs, wherein one of the first relay stations connected to the first LAN, which is designated as an operation system relay station, receives the transmission frame from the first LAN, transfers the transmission frame to the second LAN through the communication line connected to the operation system relay station, and transfers the transmission frame to another of the first relay stations, which is designated as a standby system relay station, through the bypass transmission path when the communication line connected to the operation system relay station malfunctions; and the standby system relay station stops receiving a transmission frame from the first LAN, and transmits the transmission frame, received from the operation system relay station, to the communication line connected to the standby system relay station through the bypass transmission path.

In the multiplexed network connecting apparatus having the foregoing constitution, when a communication line connected to an operation system relay station malfunctions, a transmission frame received by the operation system relay station from the sending LAN is transmitted to a standby system relay station of the sending LAN through a bypass transmission path. The transmission frame is then transmitted to a standby system relay station of the receiving LAN through a normal communication line connected to the standby system relay station.

Therefore, even though a communication line malfunctions or another communication line is used, each node of the LAN has only to prepare a transmission frame whose destination address DA is the same relay station, so that a burden for transmitting the transmission frame at the node can be decreased.

To attain the above second object, there is provided a multiplexed network connecting apparatus comprising:

a plurality of communication lines for connecting in parallel a pair of LANs spaced away from each other;

a plurality of relay stations each interposed between each of the communication lines and each of the LANs;

transmission means for transmitting a transmission frame from a first LAN of the LANs to a second LAN thereof through first relay stations connected to the first LAN, the communication lines connected to the first relay stations, and second relay stations connected to the second LAN; and a plurality of bypass transmission paths each for connecting the relay stations connected to one of the first and second LANs, wherein one of the first relay stations connected to the first relay, which is designated as an operation system relay station, receives the transmission frame from the first LAN, transfers the transmission frame to the second LAN through the communication line connected to the operation system relay station, and transfers the transmission frame to another of the first relay stations, which is designated as a standby system relay station, through the bypass transmission path when a total sum of untransmitted, received frames exceeds a predetermined number; and the standby system relay station stops receiving a transmission frame from the first LAN, and transmits the transmission frame, received from the operation system relay station, to the communication line connected to the standby system relay station through the bypass transmission path.

In the multiplexed network connecting apparatus having the foregoing constitution, when an operation system relay station receives a number of transmission frames from a LAN in a short time, it does not catch up with its relay processing, with the result that the transmission frames are brought into a wait state in the relay station. If the number of untransmitted frames in the wait state exceeds a predetermined number, the transmission frames are transferred to a standby system relay station through a bypass transmission path and then relayed thereby.

Consequently, since the transmission frames are relayed by the plural relay stations at the same time, the relay can be performed efficiently even when a number of transmission frames are received in a short time.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 1 is a block diagram schematically showing the constitution of a multiplexed network connecting apparatus according to an embodiment of the present invention;

FIG. 13 is a view showing a transmission path of the transmission frame in the system of the embodiment;

FIG. 14 is a view showing a transmission path of the transmission frame in the system of the embodiment;

FIG. 17 is a block diagram schematically showing the constitution of a prior art multiplexed network connecting system; and FIG. 18 is a block diagram schematically showing the constitution of another prior art multiplexed network connecting system.

DETAILED DESCRIPTION OF THE PREFERRED EMBODIMENT

Figure 2:
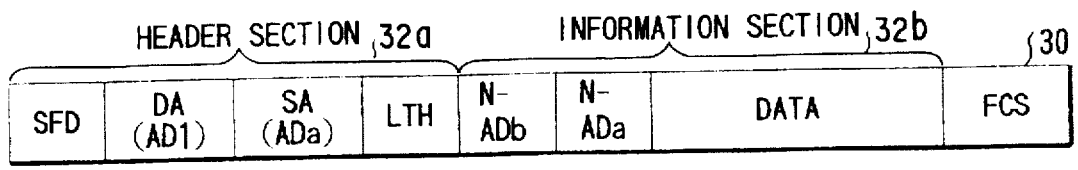
FIG. 2 is a format chart showing a transmission frame input to the system of the embodiment.

An embodiment of the present invention will now be described with reference to the accompanying drawings.

FIG. 1 is a block diagram schematically showing the constitution of a multiplexed network connecting apparatus according to an embodiment of the present invention. In FIG. 1, the same constituents as those of the prior art shown in FIG. 18 are indicated by the same reference numerals.

As shown in FIG. 1, a LAN 3a includes a transmission path 2a and a plurality of nodes 1a connected to the transmission path 2a, while a LAN 3b does a transmission path 2b and a plurality of nodes 1b connected to the transmission path 2b. A multiplexed network connecting apparatus 13 is connected between these paired LANs 3a and 3b.

In the apparatus 13, relay stations 11a and 11b are connected to the transmission paths 2a and 2b of the LANs 3a and 3b, respectively. The relay stations 11a and 11b are connected to each other by their respective communication lines 12. The relay stations 11a are connected to each other by a bypass transmission path 14a, while the relay stations 11b are connected to each other by bypass transmission path 14b.

All the relay stations 11a and 11b have the same constitution, and all the relay stations 11a (11b) connected to the same LAN 3a (3b) have the same address AD (MAC address). In this embodiment, the address of each relay station 11a of the LAN 3a is AD1, and that of each relay station 11b of the LAN 3b is AD2.

The relay stations 11a (devices 11b their separate devices ID which prioritize the relay stations 11a (11b) in the same LAN 3a (3b). For example, when the device ID is 1, the relay station 11a (11b) is given the highest priority and designated as an operation system. When the device ID is 2, the relay station 11a (11b) is given the next order of priority and designated as an operation system. If, therefore, the relay station 11a (11b) whose device ID is 1 malfunctions when it is operating as an operation system, the standby system relay station 11a (11b) whose device ID is 2 is designated as an operation system. The smaller the number of the device ID, the higher the order of priority.

When the number of untransmitted frames exceeds a predetermined value in the operation system relay station 11a (11b), the operation system relay station 11a (11b) transmits a newly received transmission frame to the standby system relay station 11a (11b). In this case, the priority order of the latter standby system relay station is one lower than that of the former operation system relay station. The devices ID therefore have another function of prioritizing the transmission frames sent to the respective relay stations 11a (11b) each designated as a standby system.

FIG. 2 is a format chart of communicating transmission frame 30 transmitted from the node 1a (address ADa) of LAN 3a to the transmission path 2a when data is sent from the node 1a to the node 1b (address ADb) of LAN 3b. The transmission frame 30 includes a header section 32a and an information section 32b. The header section 32a has a start delimiter SFD at its head and then a destination address DA for designating address AD1 of the relay station 11a, a sending address SA for designating address ADa of sending node 1a, and a data length LTH. The information section 32b has a network address N-ADb of receiving node 1b, a network address N-ADa of sending node 1a, and DATA to be transmitted. The transmission frame 30 also includes a frame check sequence FCS at its foot.

Figure 3:
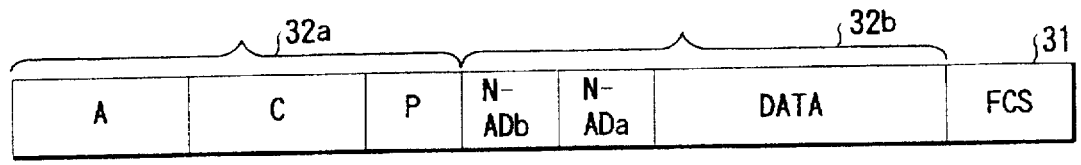
FIG. 3 is a format chart showing a transmission frame output from a relay station to a communication line in the system of the embodiment.

FIG. 3 is a format chart of communicating transmission frame 31 transmitted from one relay station 11a to another relay station 11b through the communication line 12. The transmission frame 31 includes a header section 32a and an information section 32b. The header section 32a has an address field A used for a data link on the communication line, a control field C, and a protocol identifier field P indicative of the upper protocol. The information section 32b has the same configuration as that of the transmission frame 30 shown in FIG. 2.

A communicating transmission frame transmitted from the relay station 11b to the receiving node 1b of the LAN 3b, is not shown. Such a transmission frame includes a header section having a destination address DA in which an address ADb of the receiving node 1b is set and a sending address SA in which an address AD of a sending relay station 11b is set.

Figure 4:
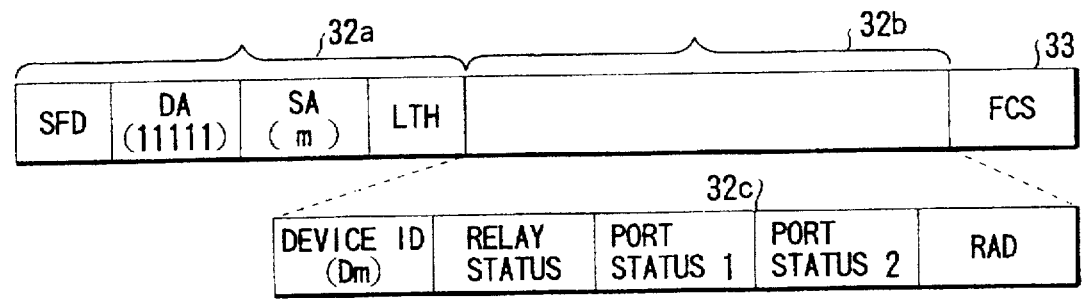
FIG. 4 is a format chart showing a managing transmission frame output from an operation system relay station of the system of the embodiment.

FIG. 4 is a format chart of a managing transmission frame 33 which is output from an operation system relay station 11a (11b) to the bypass transmission path 14a (14b) every given period T0. The managing transmission frame 33 includes a header section 32a and an information section 32b. The header section 32a has a start delimiter SFD, a destination address DA for setting a code [11111 ... ] of broadcast communication which does not designate a destination, a sending address SA for designating the priority order m of device ID of sending relay station 11a (11b), and a data length LTH. Management information 32c is set in the information section 32b.

The management information 32c is constituted of a device ID (priority order m) for specifying an operation system relay station 11a (11b) which has output the managing transmission frame 33, a relay status indicating whether a processing for relaying the communicating transmission frame 30 in the operation system relay station 11a (11b) is normal or not, a port status 1 representing whether a transfer of transmission frame 30 between the port status 1 and LAN 3a (3b) connected thereto is normal or not, a port status 2 representing whether a transfer of transmission frame 31 between the port status 2 and communication line 12 is normal or not, and PAD in which dummy data is set in order that the management information 32c has more than a predetermined data length (46 bytes).

Consequently, each standby system relay station 11a (11b), which has received the managing transmission frame 33 through the bypass transmission path 14a (14b), is able to immediately detect the operation state of the operation system relay station 11a (11b).

Figure 5:
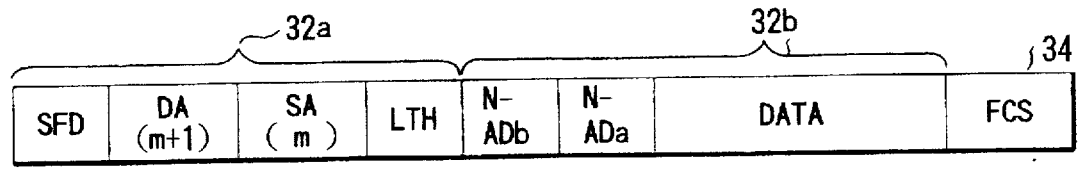
FIG. 5 is a format chart showing a transmission frame transferred from an operation system relay station to a standby system relay station in the system of the embodiment.

FIG. 5 is a format chart of a communicating transmission frame 34 which is output from an operation system relay station 11a (11b) to the bypass transmission path 14a (14b). The transmission frame 34 includes a header section 32a and an information section 32b. The header section 32a is constituted of a start delimiter SFD, a destination address DA for designating the priority order (m+1) of a receiving standby system relay station 11a (11b), a sending address SA for designating the priority order m of the operation system relay station, and a data length LTH. The information section 32b has the same configuration as that of the transmission frame 30 shown in FIG. 2.

Figure 6:
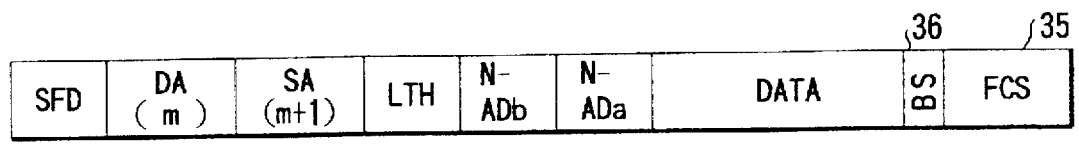
FIG. 6 is a format chart showing a transmission frame transferred from a standby system relay station to an operation system relay station in the system of the embodiment.

FIG. 6 is a format chart of a communicating transmission frame 35 which is output from a standby system relay station 11a (11b) to the bypass transmission path 14a (14b). The transmission frame 35 includes a header section 32a and an information section 32b. The header section 32a is constituted of a start delimiter SFD, a destination address DA for designating the priority order m of a receiving operation system relay station 11a (11b), a sending address SA for designating the priority order (m+1) of the standby system relay station, and a data length LTH. The information section 32b has busy information 36, in addition to the configuration of the transmission frame 30 shown in FIG. 2.

Figure 7:
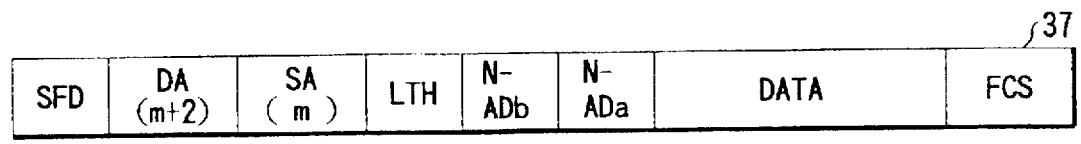
FIG. 7 is a format chart showing a transmission frame transferred from an operation system relay station to another standby system relation station in the system of the embodiment.

FIG. 7 is a format chart of communicating transmission frame 37 which is output to the bypass transmission path 14a (14b) after the operation system relay station 11a (11b) receives the transmission frame 35 including the busy information 36. The transmission frame 37 includes a header section 32a and an information section 32b. The section 32a is constituted of a start delimiter SFD, a destination address DA for designating the priority order (m+2) of the receiving standby system relay station 11a (11b), a sending address SA for designating the priority order m of the operation system relay station, and a data length LTH. The information section 32b has the same configuration as that of the transmission frame 30 shown in FIG. 2.

Figure 8:
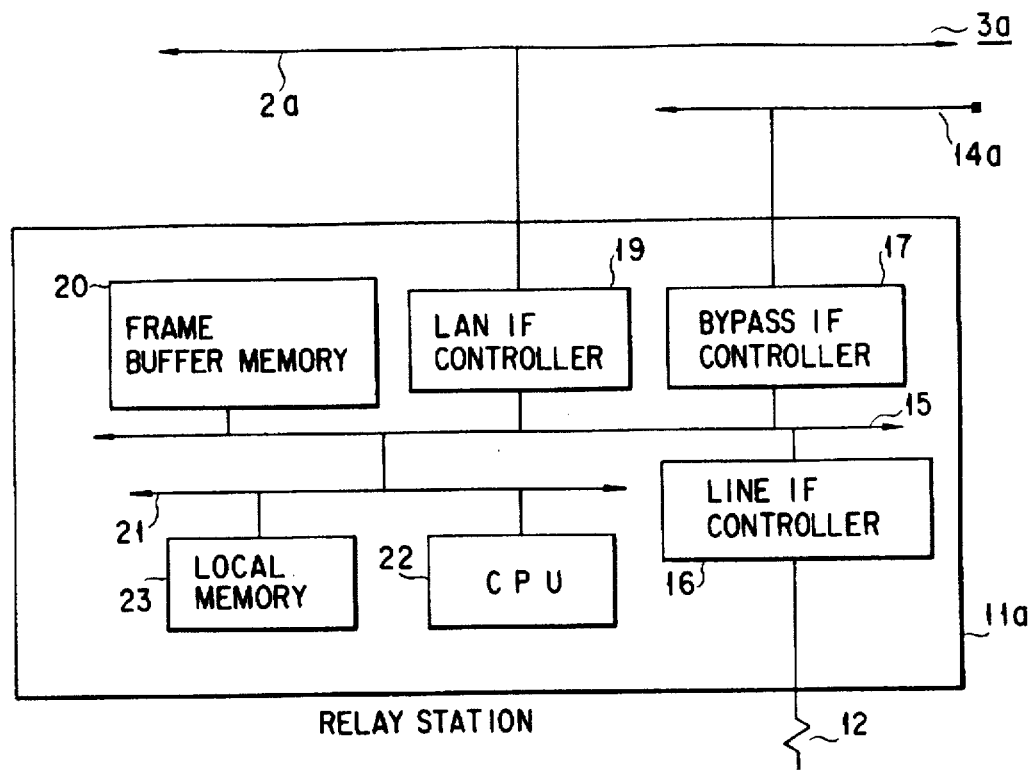
FIG. 8 is a block diagram schematically showing the constitution of the relay station of the system of the embodiment.

FIG. 8 is a block diagram schematically showing the constitution of the relay station 11a connected to the LAN 3a. The relay station 11a includes a line IF (interface) controller 16 for receiving/transmitting the communicating transmission frame 31, as shown in FIG. 3, from/to the communication line 12, a bypass IF controller 17 for receiving/transmitting the managing transmission frame 33, as shown in FIG. 4, and the communicating transmission frames 34, 35 and 37, as shown in FIGS. 5–7, from/to the bypass transmission path 14a, a LAN IF controller 19 for receiving/transmitting the communicating transmission frame 30 from/to the transmission path 2a of the LAN 3a, and a frame buffer memory 20 for temporarily storing the communicating transmission frame 30 received from the LAN 3a. The controllers 16, 17 and 19 and the memory 20 are connected to a system bus 15.

The relay station 11a also includes a CPU 22 for executing various types of information processing containing a processing for relaying the communicating transmission frame 30 and a local memory 23 for storing various programs and various set data items. The CPU 22 and local memory 23 are connected to a CPU bus 21, and the CPU bus 21 is connected to the system bus 15.

The local memory 23 stores a plurality of programs such as a program for relaying the communicating transmission frame 30, an abnormality detection program for detecting whether the communication line 12 connected to the relay station 11a is abnormal or not, a self-checking program for detecting incapability of receiving the communicating transmission frame 30 due to malfunction of the LAN IF controller 19 or for detecting abnormality such as an error in relay processing, a management program for exchanging information with another relay station 11a via the bypass transmission path 14a using the managing transmission frame 33, and the like.

Figure 9:
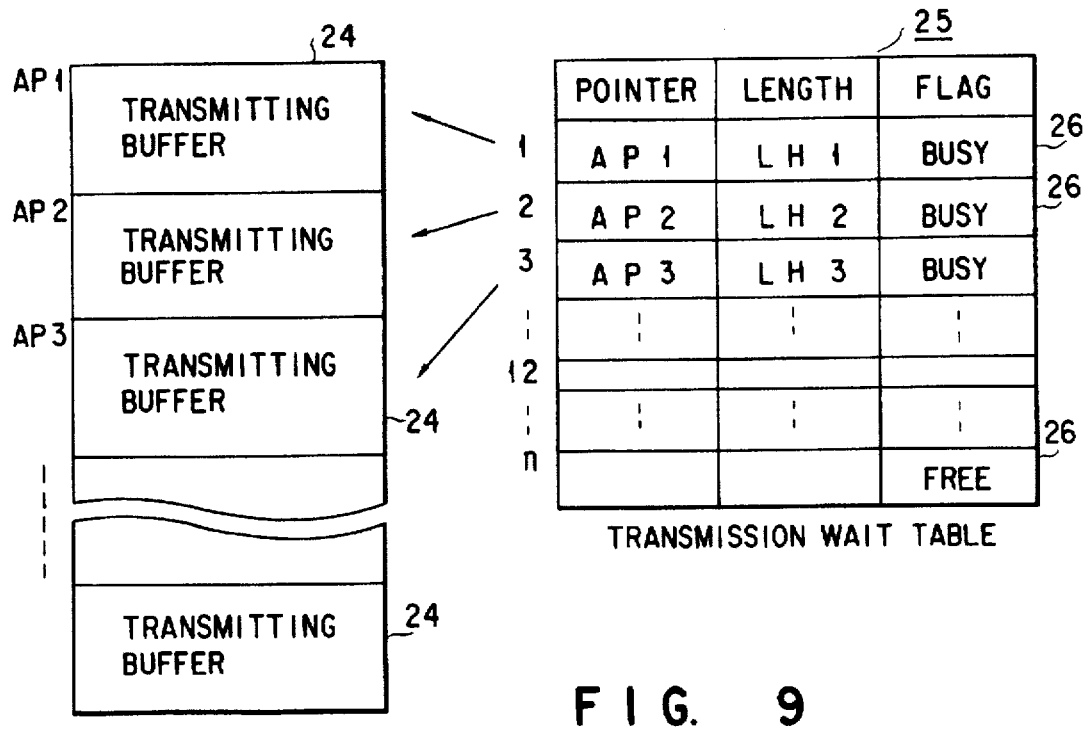
FIG. 9 is a view showing the memory configuration of a frame buffer memory in the relay station shown in FIG. 8.

As shown in FIG. 9, the frame buffer memory 20 includes n transmitting buffers 24 each for storing one communicating transmission frame 30. The CPU 22 reads the transmission frames 30 in sequence from the respective transmitting buffers 24 to relay the transmission frames. Thus, the relayed transmission frames 30 are automatically erased from their corresponding transmitting buffers 24. It is only untransmitted frames 30 in a relay wait state that remain in the transmitting buffers 24.

The frame buffer memory 20 also includes a transmission wait table 25 representing the storage conditions of the transmission frames 30 in the transmitting buffers 24. The table 25 has n regions corresponding to the n transmitting buffers 24.

Each of the regions 26 stores a pointer AP indicative of the initial address AP of the corresponding transmitting buffer 24, length LH of the transmission frame 30 stored therein, and a busy/free flag representing whether the transmission frame 30 is actually stored in the transmitting buffer 24 or not.

An operation of the operation system relay station 11a will now be described.

If there are untransmitted frames 30 in the transmitting buffers 24 of the frame buffer memory 20 of the relay station 11a, the relay station 11a reads them in order of storage, and arranges a destination address DA and a sending address SA of header section 32 of each of the transmission frames 31, as shown in FIG. 3. The relay station 11a transfers the arranged transmission frames 31 to the relay station 11b of a received LAN 3b via the line IF controller 16 and communication line 12 thereof, thus updating the contents stored in the communication wait table 25.

Figure 10:
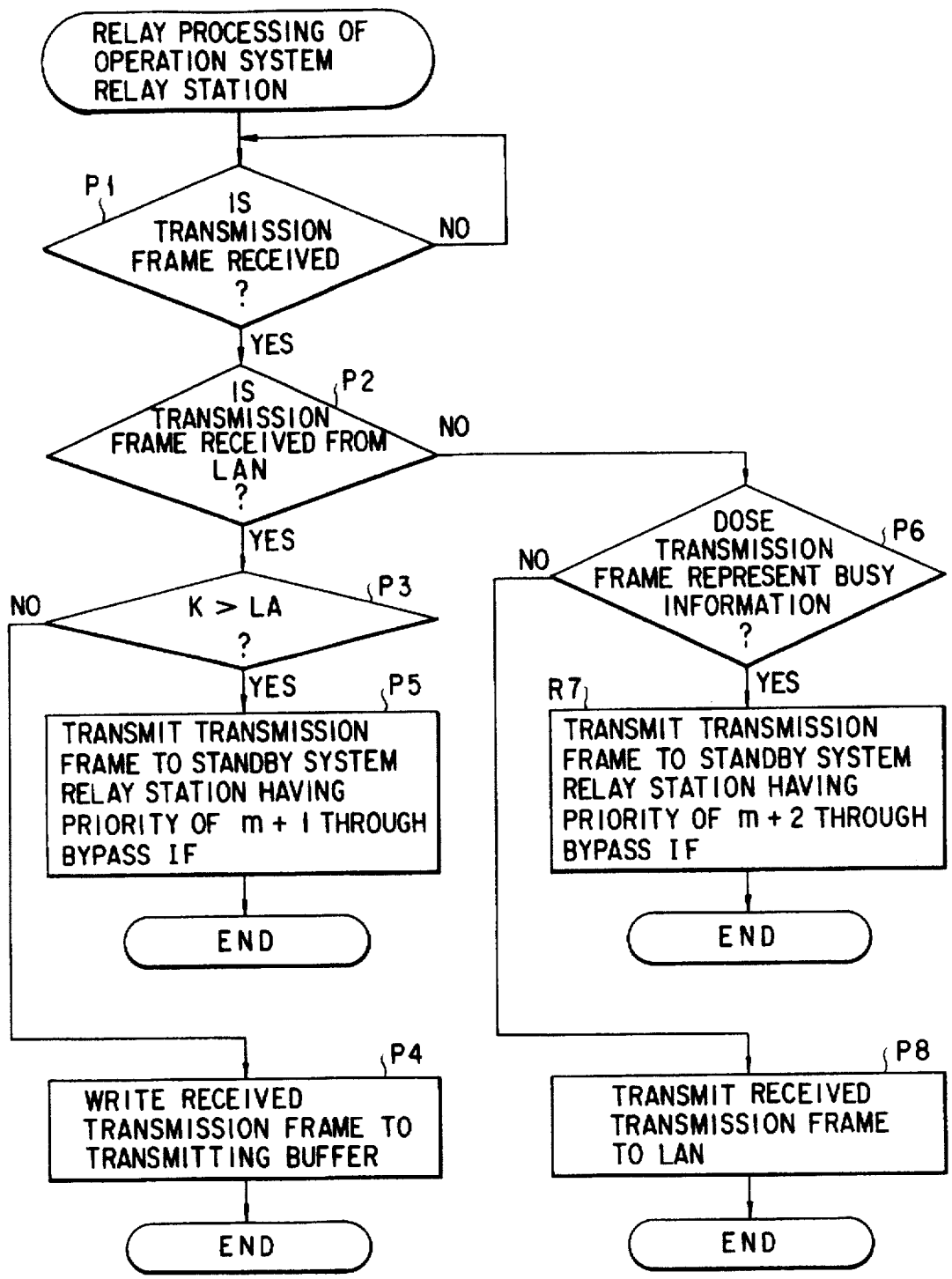
FIG. 10 is a flowchart showing an operation of an operation system relay station in the system of the embodiment.

In parallel with the above-described normal relay processing, the frame reception processing as shown in FIG. 10 is executed. If one transmission frame is received (step P1), its sending side is checked (step P2). When a communicating transmission frame 30 is received from the LAN 3a connected to the relay station 11a, the number K of untransmitted frames 30 is calculated from information stored in the communication wait table 25. If the number K is smaller than threshold value LA which is somewhat smaller than the number n of transmitting buffers (step P3), the received transmission frame 30 is written to the initial free transmitting buffer 24 of the frame buffer memory 20, thereby updating the contents stored in the communication wait table 25 (step P4).

If in step P3 the number K is larger than the threshold value LA, a transmission frame 34, as shown in FIG. 5, is prepared. The destination address DA of the frame 34 is designated as a standby system relay station 11a whose priority order (m+1) is one lower than that (m) of the operation system relay station 11a. The prepared transmission frame 34 is transferred to the standby system relay station 11a through the bypass transmission path 14a (step P5). In other words, the transmission frame received from the LAN 3a is transferred to the standby system relation station.

If the operation system relay station 11a has the lowest priority order (m), the transmission frame 34 is transmitted to one of the standby relay stations 11a which has the highest priority order.

If in step P2 a transmission frame is received from the standby relay station 11a having a priority order (m+1) through the bypass transmission path 14a, it is determined in step P6 whether the received transmission frame is equivalent to the transmission frame 35 with busy information 36 as shown in FIG. 6. If YES in step P6, the previously-transmitted communicating transmission frame 34 can be considered to be one which has not been relayed to another LAN 3b even in the receiving relay station 11a.

Then, a transmission frame 37, as shown in FIG. 7, is prepared from the communicating transmission frame 35, the destination address DA of the frame 37 being a standby system relay station 11a whose priority order (m+2) is much lower. The prepared transmission frame 37 is transferred to the standby system relay station 11a through the bypass transmission path 14a (step P7). In other words, the transmission frame received from the LAN 3a, is transmitted to the standby relay station whose priority order is much lower.

If the relay station 11a receiving the transmission frame 34 has the lowest priority order (m+1), the transmission frame 37 is transmitted to one of the standby relay stations 11a which has the highest priority order.

If, in step P6, the received transmission frame is not equivalent to the transmission frame 35 with busy information, it is considered to be the normal communicating transmission frame 31 transmitted through the communication line 12 connected from the LAN 3b to the relay station 11a or the communicating transmission frame 31 transmitted from the LAN 3b through the standby system communication line 12, relay station 11a and bypass transmission path 14a. The received transmission frame 31, whose destination address DA and sending address SA are changed, is sent to the LAN 3a via the LAN IF controller 19 (step P8).

The operation system relay station 11a always monitors whether the operating condition of the relay station 11a is normal or not and whether that of the communication line 12 is normal or abnormal, through the LAN IF controller 19 and line IF controller 16, and creates a managing transmission frame 33, as shown in FIG. 4, every given period T0 on the basis of the monitoring and supplies it to the bypass transmission path 14a.

When the relay status of management information 32c of the frame 33 is set abnormal and is the port status 1 thereof, the relay station cannot fulfill its own function at all and thus its operating mode is changed from the operation system to the standby system. After that, the transmission/reception of the communicating transmission frame 30 to/from the LAN 3a is stopped.

An operation of the standby system relay station 11a will now be described.

Figure 11:
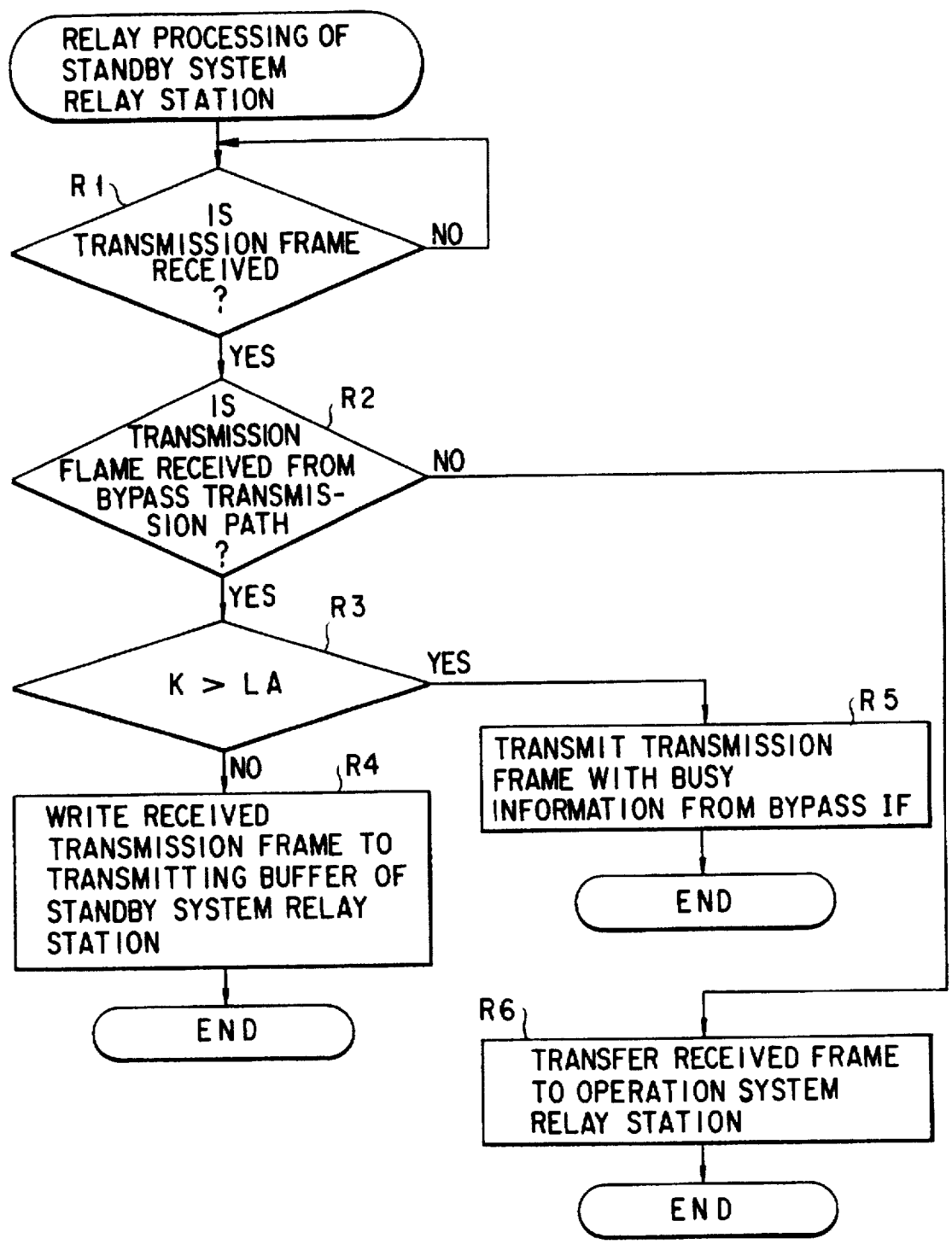
FIG. 11 is a flowchart showing an operation of a standby system relay station in the system of the embodiment.

FIG. 11 is a flowchart showing the operation of the standby system relay station 11a when it receives a communicating transmission frame.

When the relay station 11a receives a communicating transmission frame (step R1), it is determined whether the communicating transmission frame is a transmission frame 34 received through the bypass transmission path 14a or a transmission frame 31 received through the communication line 12 of the relay station 11a (step R2). If it is the transmission frame 34, the number K of untransmitted frames 34 is calculated from information stored in the communication wait table 25 of the relay station 11a. If the number K is smaller than the threshold value LA (step R3), the received transmission frame 34 is written to the initial free transmitting buffer 24. Then, the contents stored in the table 25 are updated (step R4).

Even though the untransmitted frames 34 are stored in the transmitting buffer 24 of the standby system relay station 11a, the standby system relay station 11a relay these frames 34.

If the number K is not smaller than the threshold value LA (step R3), a transmission frame 35 with busy information 36, as shown in FIG. 6, is prepared, and the prepared frame 35 is returned to the sending operation system relay station 11a via the bypass transmission path 14a (step R5).

If the received communicating transmission frame is the transmission frame 31 (step R2), since the transmission frame 31 is one received from the LAN 3b, it is transferred to the operation system relay station 11a through the bypass transmission path 14a (R6).

Figure 12:
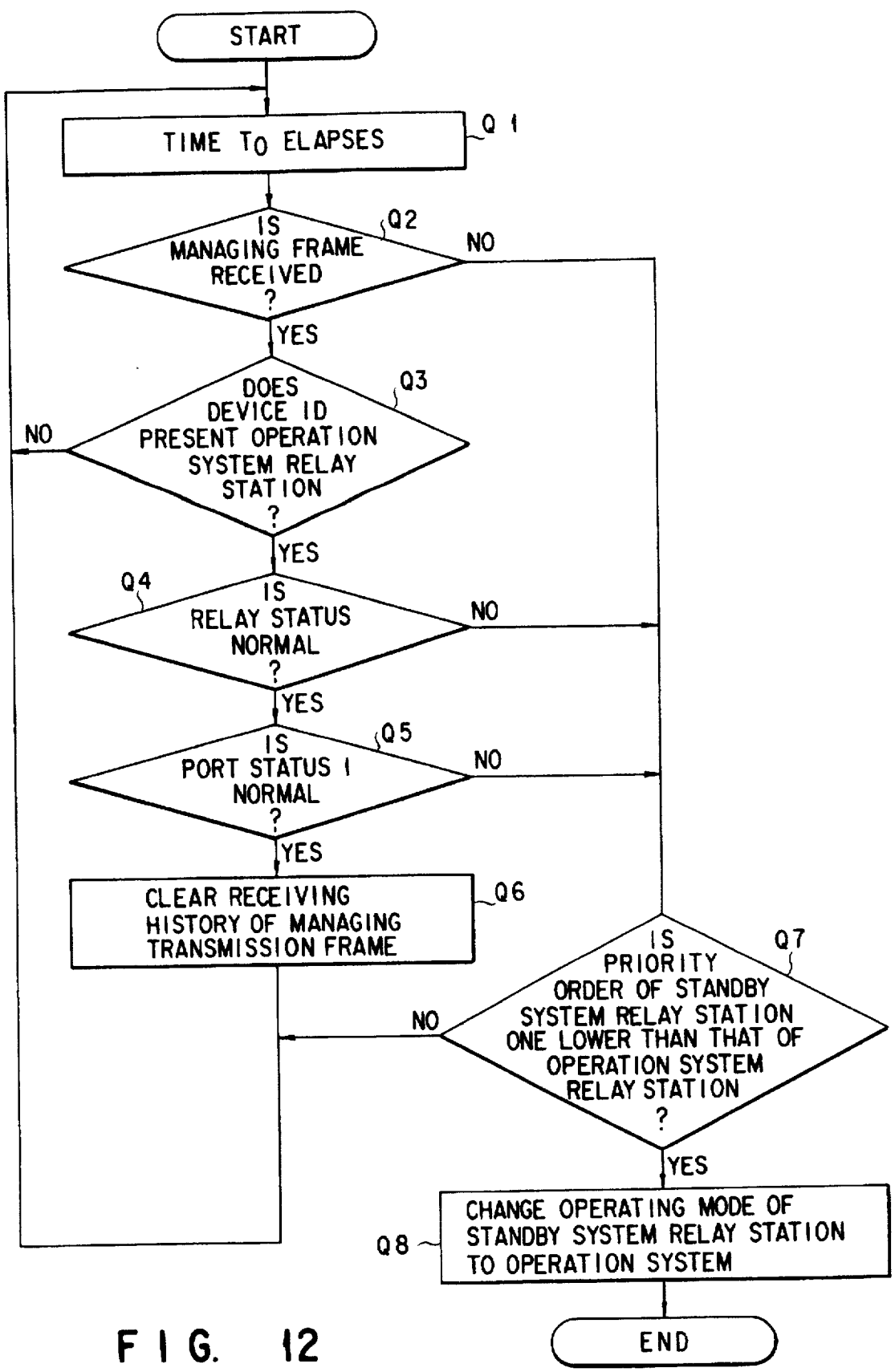
FIG. 12 is a flowchart showing an operation of a standby system relay station in the system of the embodiment.

If the standby system relay station 11a receives a managing transmission frame 33 through the bypass transmission path 14a, it executes the management control in accordance with the flowchart shown in FIG. 12.

When the standby system relay station 11a receives the managing transmission frame 33 (step Q2) after a lapse of given period T0 (step Q1), management information 32c is read out of the frame 33, and it is confirmed that the device ID (priority order m) represents the operation system relay station 11a (step Q3). It is then checked whether the relay status of management information 32c is normal or not (step Q4). If it is normal, the flow goes to step Q5, in which the port status 1 thereof is checked. If the port status 1 is normal, the flow advances to step Q6, in which the received managing transmission frame 33 is cleared (Q6).

Even after the given period T0 elapses, if the managing transmission frame 33 is not received in step Q2, the relay status is abnormal in step Q4, and the port status 1 is abnormal in step Q5, it is determined that the current operation system relay station 11a is abnormal and the operating mode of the relay station 11a is changed from the operation system to the standby system. The flow thus goes to step Q7.

If in step Q7 the priority order (m+1) of the standby system relay station is one lower than that (m) of the relay station 11a currently designated as an operation system, the flow goes to step Q8, in which the standby system relay station is switched to the operation system relay station.

Even when the managing transmission frame 33 is not received at the current period T0 in step Q2, the standby system relay station 11a can control the device ID (priority order m) of the operation system relay station 11a by means of the managing transmission frame 33 received at the last period T0.

The relay station 11a, which is given the highest priority, changes its own operating mode from the standby system to the operation system, when the relay station 11a is designated as a standby system and the operation system relay station 11, which is considered to be abnormal by the managing transmission frame 33, is given the lowest priority.

If, however, the standby system relay station becomes incapable of relaying the transmission frames or the LAN port fails, the operating mode is not changed.

An operation of the multiplexed network connecting apparatus having the above constitution will be described with reference to FIGS. 13 to 16.

For easy description, it is only three relay stations 11a (1), 11a (2) and 11a (3) that are connected to a LAN 3a, while it is also three relay stations 11b (1), 11b (2) and 11b (3) that are connected to a LAN 3b. The priority of the relay stations is in the order of (1), (2) and (3).

Assume in FIG. 13 that the left-hand relay station 11a (1), communication line 12 and relay station 11b (1) are each designated as an operation system.

Under the normal condition, for example, a transmission frame 30 is transferred from the node 1a of the LAN 3a to the node 1b of the LAN 3b through a path A constituted of the above operation system relay station 11a (1), communication line 12 and relay station 11b (1), as shown in FIG. 13.

If the operation system relay station 11a (1) fails and thus cannot be used, it changes to a standby system relay station, and the relay station 11a (2) having the second highest priority order serves as an operation system. As a result, as shown in FIG. 14, the transmission frame is transmitted to the receiving LAN 3b via a path B constituted of the relay station 11a (2), communication line 12, relay station 11b (2), bypass transmission path 14b and relay station 11b (1) each of which is newly designated as an operation system.

As illustrated in FIG. 13, if a number of transmission frames 30 are generated for a short time when the relay station 11a (1) is designated as an operation system, they cannot be transmitted with efficiency for a short time only through the operation system relay station 11a (1). In this case, as shown in FIG. 15, the transmission frames are transmitted to the receiving LAN 3b through not only the normal path A but also a path C constituted of the bypass transmission path 14a, standby system relay station 11a (2) having the priority order which is lower than that of the operation system relay station 11a (1), communication line 12 connected to the standby system relay station 11a (2), relay station 11b (2), bypass transmission path 14b, and relay station 11b (1).

Figure 15:
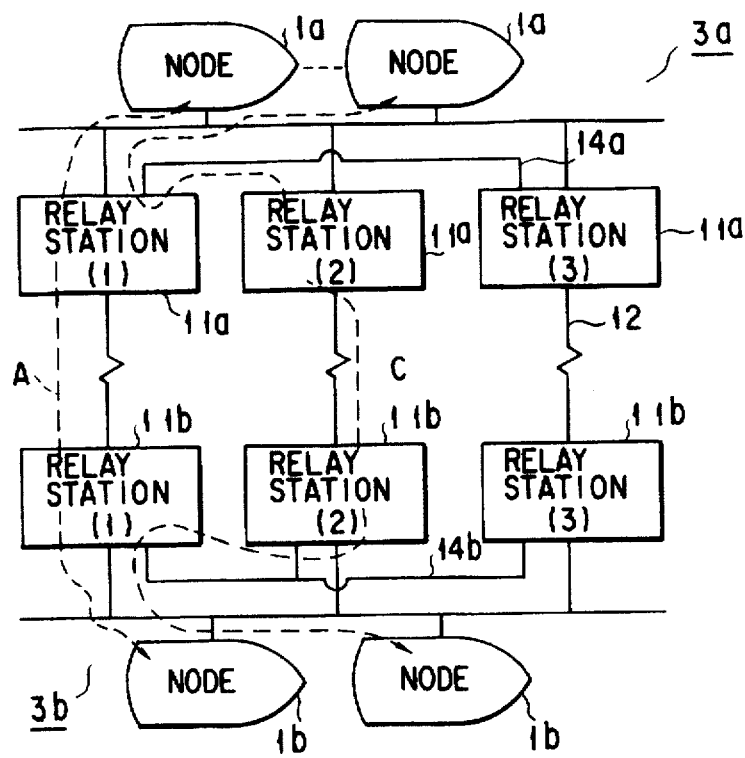
FIG. 15 is a view showing a transmission path of the transmission frame in the system of the embodiment.
Figure 16:
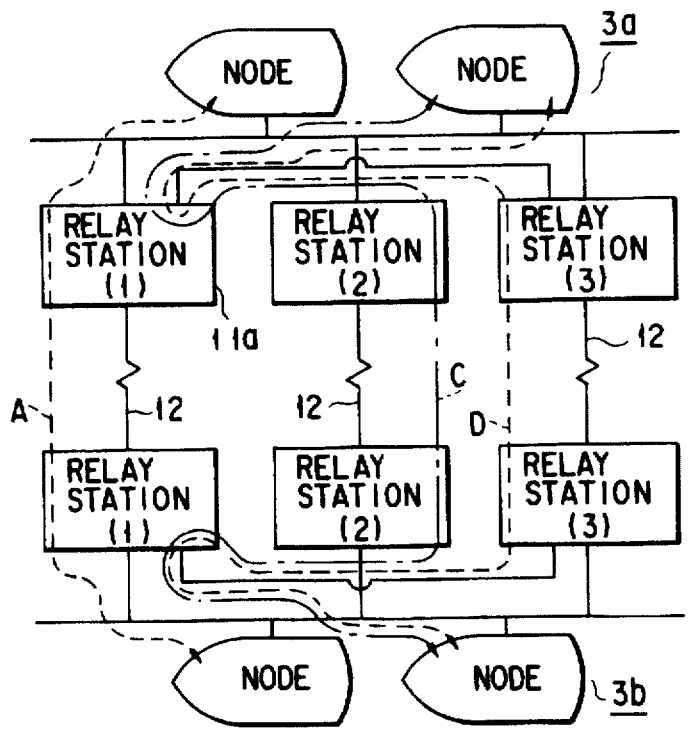
FIG. 16 is a view showing a transmission path of the transmission frame in the system of the embodiment.

If a large number of transmission frames 30 are generated, they are transmitted to the receiving LAN 3b through not only the paths A and C shown in FIG. 15 but also a path D constituted of the standby system relay station 11a (3) having the priority order which is lower than that of the standby system relay station 11a (2), communication line 12 connected to the standby system relay station 11a (3), relay station 11b (3), bypass transmission path 14b, and relay station 11b (1).

Consequently, even though any abnormality occurs in the path A, the transmission frames 30 are reliably transmitted to the node of the receiving LAN through the other path B.

All the relay stations 11a (1), 11a (2) and 11a (3) (11b (1), 11b (2) and 11b (3)) are assigned the same address AD1 (AD2). Therefore, even though the operation system relay station 11a is changed to another relay station 11a due to the foregoing abnormality, the respective nodes 1a and 1b have only to generate transmission frames 30 with the same destination address DA (AD1, AD2) irrespective of information indicating the change in operation system, thereby reducing a burden for processing information at the nodes 1a and 1b.

By using the standby system paths C and D which are not usually used, the load of the operation system relay station 11a (1) can be dispersed, and the relay of the transmission frames 30 is greatly improved in efficiency as the whole of multiplexed network connecting apparatus 13.

When the paths C and D are used, if the number K of untransmitted frames exceeds a predetermined value LA, the received transmission frames 30 are transferred to the standby system relay stations 11a and 11b through the bypass transmission paths 14a and 14b. Thus, even if not the operation but the standby system relay stations 11a (2), 11a (3), 11b (2) and 11b (3) are used, thee nodes 1a and 1b of the LANs 3a and 3b need not change the initial destination address DA of the transmission frame 30. Since neither of the nodes considers the number K in the apparatus 13 at all, it is possible to reduce a burden for processing the transmission frames 30 at the nodes 1a and 1b.

Consequently, in the above-described multiplexed network connecting apparatus 13, the reliability of information communications can be secured by multiplexing the communication paths without increasing a burden for processing the transmission frames at the nodes 1a and 1b, and the relay of the transmission frames can be greatly improved in efficiency.

As described above, in the multiplexed network connecting apparatus of the present invention, the relay stations connected to each LAN are connected to each other through the bypass transmission paths. If, therefore, the bypass transmission paths are utilized, a malfunctioning communication line or relay station can be automatically switched to a normal one, without causing each node to determine whether a relay station is an operation system or a standby system. The processing of the transmission frames at each node can be greatly improved in efficiency, in addition to the original function of improving the reliability of information communications by multiplexing.

If, furthermore, a burden for the relay processing of the relay station designated as an operation system is increased, the relay processing of a transmission frame can be shared with a standby system relay station and communication line. Thus, the transmission processing of the transmission frame can be improved in efficiency as the whole of the multiplexed network connecting apparatus, and accordingly the transmission speed of the transmission frame can be increased as the whole of the apparatus.

The present invention is not limited to the embodiment described above.

In the above embodiment, each of the relay stations 11a and 11b is constituted by, for example, a router. The relay stations 11a and 11b relay the transmission frames through an OSI (open systems interconnection) hierarchical model network layer. When each node 1a (1b) of LAN 3a (3b) transmits information to each node 1b (1a) of another LAN 3b (3a), addresses AD1 and AD2 of relay stations 11a and 11b are set in the destination address DA of header section 32a of the frame 30, as shown in FIG. 2.

However, each of the relay stations 11a and 11b can be constituted by, for example, a repeater or a bridge and, in this case, these relay stations relay the transmission frames through an OSI hierarchical model data link layer. Therefore, when each node 1a (1b) of LAN 3a (3b) transmits information to each node 1b (1a) of another LAN 3b (3a), addresses ADb and ADa of the receiving nodes 1b and 1a can be set in the initial address of header section 32a of the frame 30.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A multiplexed network connecting apparatus comprising:

a plurality of communication lines for connecting in parallel a pair of LANs spaced away from each other;

a plurality of relay stations each interposed between each of said communication lines and each of said LANs;

transmission means for transmitting a transmission frame from a first LAN of said LANs to a second LAN thereof through first relay stations connected to the first LAN, the communication lines connected to the first relay stations, and second relay stations connected to the second LAN; and a plurality of bypass transmission paths each for connecting the relay stations connected to one of the first and second LANs, wherein one of the first relay stations connected to the first LAN, which is designated as an operation system relay station, receives the transmission frame from the first LAN, transfers the transmission frame to the second LAN through the communication line connected to the operation system relay station, and transfers the transmission frame to another of the first relay stations, which is designated as a standby system relay station, through the bypass transmission paths when the communication line connected to the operation system relay station malfunctions; and the standby system relay station stops receiving a transmission frame from the first LAN, and transmits the transmission frame, received from the operation system relay station, to the communication line connected to the standby system relay station through the bypass transmission paths.

2. The apparatus according to claim 1, wherein the operation system relay station transmits check information indicative of whether the operation system relay station is normal to the standby system relay station through the bypass transmission paths regularly or irregularly, and switches an operation system thereof to a standby system when the operation system relay station is abnormal; and the standby system relay station switches a standby system thereof to an operation system when the check information transmitted from the operation system relay station indicates that the operation system relay station is abnormal.

3. The apparatus according to claim 2, wherein the check information is included in a managing transmission frame, and the operation system relay station transmits the managing transmission frame including the check information to the bypass transmission paths.

4. The apparatus according to claim 2, wherein said plurality of relay stations have ID information corresponding to different priority orders;

said operation system relay station transmits a managing transmission frame including the check information and the ID information to the bypass transmission paths; and said standby system relay station switches an operation system thereof to an operation system when the check information included in the managing transmission frame received through the bypass transmission path indicates that the operation system relay station is abnormal and when the priority order of the standby system relay station is one lower than that of the ID information included in the managing transmission frame.

5. The apparatus according to claim 4, wherein a standby system relay station having a highest priority order switches a standby system thereof to an operation system when the check information included in the managing transmission frame received through the bypass transmission paths indicates that the operation system relay station is abnormal and when the ID information included in the managing transmission frame has a lowest priority order.

6. The apparatus according to claims 3, 4 or 5, wherein said managing transmission frame is a broadcast communication transmission frame which does not designate a destination.

7. The apparatus according to claim 1, wherein said plurality of relay stations have ID information corresponding to different priority orders; and said operation system relay station transmits the transmission frame to a standby system relay station whose priority order is one lower than that of said operation system relay station, through the bypass transmission paths when the communication line malfunctions.

8. The apparatus according to claim 5, wherein said managing transmission frame includes connection information indicative of whether a connection between a relay station and a LAN corresponding thereto is normal and communication line information indicative of whether a communication line connected to the relay station malfunctions, as well as the check information.

9. The apparatus according to claim 8, wherein said standby system relay station switches a standby system thereof to an operation system when one of the check information and the connection information both included in the managing transmission frame indicates that the operation system relay station is abnormal and when said standby system relay station has a priority order which is one lower than that of the ID information included in the managing transmission frame.

10. A multiplexed network connecting apparatus comprising:

a plurality of communication lines for connecting in parallel a pair of LANs spaced away from each other;

a plurality of relay stations each interposed between each of said communication lines and each of said LANs;

transmission means for transmitting a transmission frame from a first LAN of said LANs to a second LAN thereof through first relay stations connected to the first LAN, the communication lines connected to the first relay stations, and second relay stations connected to the second LAN; and a plurality of bypass transmission paths each for connecting the relay stations connected to one of the first and second LANs, wherein one of the first relay stations connected to the first LAN, which is designated as an operation system LAN station, receives the transmission frame from the first LAN, transfers the transmission frame to the second LAN through the communication line connected to the operation system relay station, and transfers the transmission frame to another of the first relay stations, which is designated as a standby system relay station, through the bypass transmission paths when a total sum of untransmitted, received frames exceeds a predetermined number; and the standby system relay station stops receiving a transmission frame from the first LAN, and transmits the transmission frame, received from the operation system relay station, to the communication line connected to the standby system relay station through the bypass transmission paths.

11. The apparatus according to claim 10, wherein said plurality of relay stations have ID information corresponding to different priority orders; and said operation system relay station transmits the transmission frame to a standby system relay station whose priority order is one lower than that of said operation system relay station through the bypass transmission paths when the total sum of untransmitted, received frames exceeds the predetermined number.

12. The apparatus according to claim 11, wherein if said standby system relay station receives a transmission frame, designating said standby system relay station, through the bypass transmission paths when a total sum of untransmitted frames received by said standby system relay station exceeds a predetermined number, the transmission frame is provided with busy information and returned to said operation system relay station through the bypass transmission paths; and if said operation system relay station receives the transmission frame with the busy information through the bypass transmission paths, the transmission frame is transmitted to another standby system relay station, whose priority order is one lower than that of said standby system relay station previously receiving the transmission frame, through the bypass transmission paths.

13. The apparatus according to claim 12, wherein said operation system relay station receives the transmission frame with the busy information through the bypass transmission paths and, when the relay station previously receiving the transmission frame has a lowest priority order, the transmission frame is transmitted to a standby system relay station having a highest priority order.

14. The apparatus according to claims 10, 11 or 12, wherein each of said plurality of relay stations includes a frame buffer memory for temporarily storing a frame which has been untransmitted but is to be transmitted to a communication line connected to said each of said plurality of relay stations.

15. A multiplexed network connecting apparatus comprising:

a plurality of communication lines for connecting in parallel a pair of LANs spaced away from each other;

a plurality of relay stations each interposed between each of said communication lines and each of said LANs;

transmission means for transmitting a transmission frame from a first LAN of said LANs to a second LAN thereof through first relay stations connected to the first LAN, the communication lines connected to the first relay stations, and second relay stations connected to the second LAN; and a plurality of bypass transmission paths each for connecting the relay stations connected to one of the first and second LANs, wherein one of the first relay stations connected to the first LAN, which is designated as an operation system relay station, receives the transmission frame from the first LAN, transfers the transmission frame to the second LAN through the communication line connected to the operation system relay station, and transfers the transmission frame to another of the first relay stations, which is designated as a standby system relay station, through the bypass transmission paths when the communication line connected to the operation system relay station malfunctions or a total sum of untransmitted, received frames exceeds a predetermined number.

16. The apparatus according to claims 1, 10 or 15, wherein a plurality of relay stations connected to one of the LANs have a same address.

* * * * *